(12) United States Patent
Watanabe et al.

(10) Patent No.: US 7,800,781 B2
(45) Date of Patent: Sep. 21, 2010

(54) RECORDING MEDIUM AND COLOR ADJUSTING APPARATUS

(75) Inventors: Masahiro Watanabe, Kawasaki (JP); Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 882 days.

(21) Appl. No.: 11/588,500

(22) Filed: Oct. 27, 2006

(65) Prior Publication Data
US 2007/0296986 A1 Dec. 27, 2007

(30) Foreign Application Priority Data
Jun. 23, 2006 (JP) ............................. 2006-174355

(51) Int. Cl.
*G03F 3/08* (2006.01)
(52) U.S. Cl. ....................... 358/1.9; 358/518
(58) Field of Classification Search ................ 358/1.1, 358/1.9, 504, 518, 520, 406; 382/162, 167
See application file for complete search history.

(56) References Cited

U.S. PATENT DOCUMENTS 7,385,739 B2 * 6/2008 Ohga et al. ................. 358/518
2003/0053094 A1 3/2003 Ohga et al.
2003/0053097 A1 * 3/2003 Ohga et al. ................. 358/1.9
2006/0132873 A1 * 6/2006 Ohkawa ..................... 358/518

FOREIGN PATENT DOCUMENTS

| EP | 1 294 177 A2 | 3/2003 |
| JP | 8-321957 | 12/1996 |
| JP | 2003-125221 | 4/2003 |
| JP | 2003-250058 | 9/2003 |
| JP | A 2005-176202 | 6/2005 |

* cited by examiner

*Primary Examiner*—Thomas D Lee
(74) *Attorney, Agent, or Firm*—Fujitsu Patent Center

(57) ABSTRACT

With a recording medium causing a computer to execute a color adjustment program used for the color adjustment of a display, weights are assigned to the adjustment amounts of colors included in an adjustment range in correspondence with a positional relationship with a target color in color space, and the adjustment amount of the target color, when information about the target color to be adjusted, the adjustment amount indicating the amount of the color adjustment made to the target color, and the adjustment range for deciding the range of colors to be adjusted along with the target color are input. According to the weights, colors after the adjustment for the target color and the colors included in the adjustment range are calculated, and a three-dimensional region corresponding to the calculated colors is drawn in the color space.

8 Claims, 17 Drawing Sheets

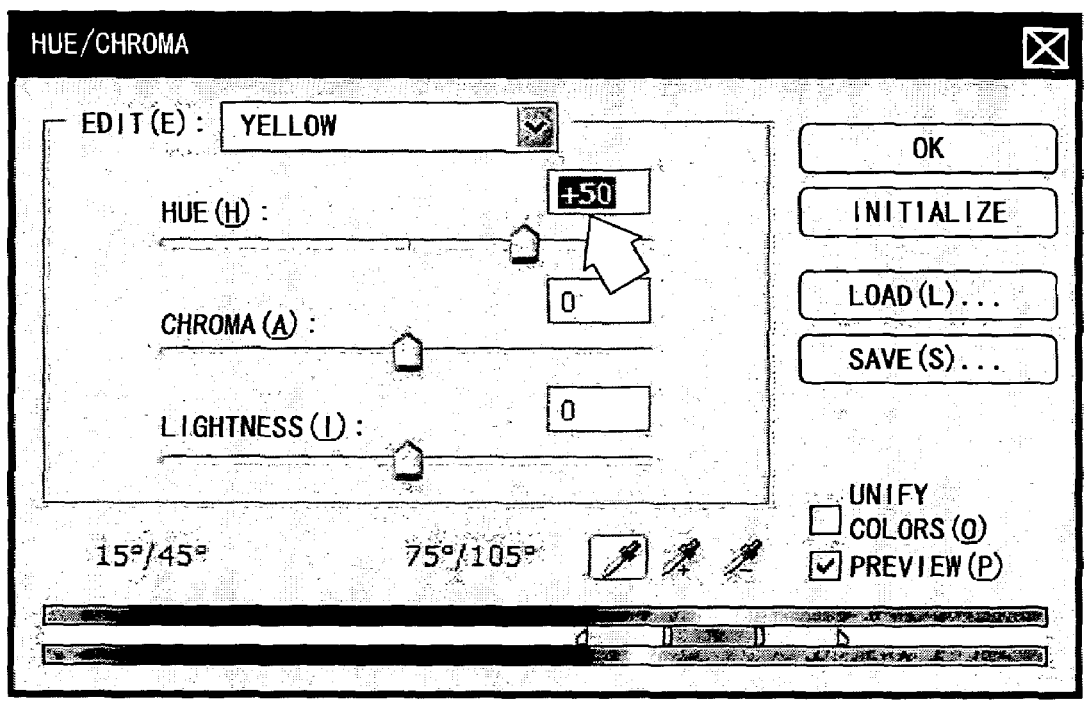
F I G. 1 A

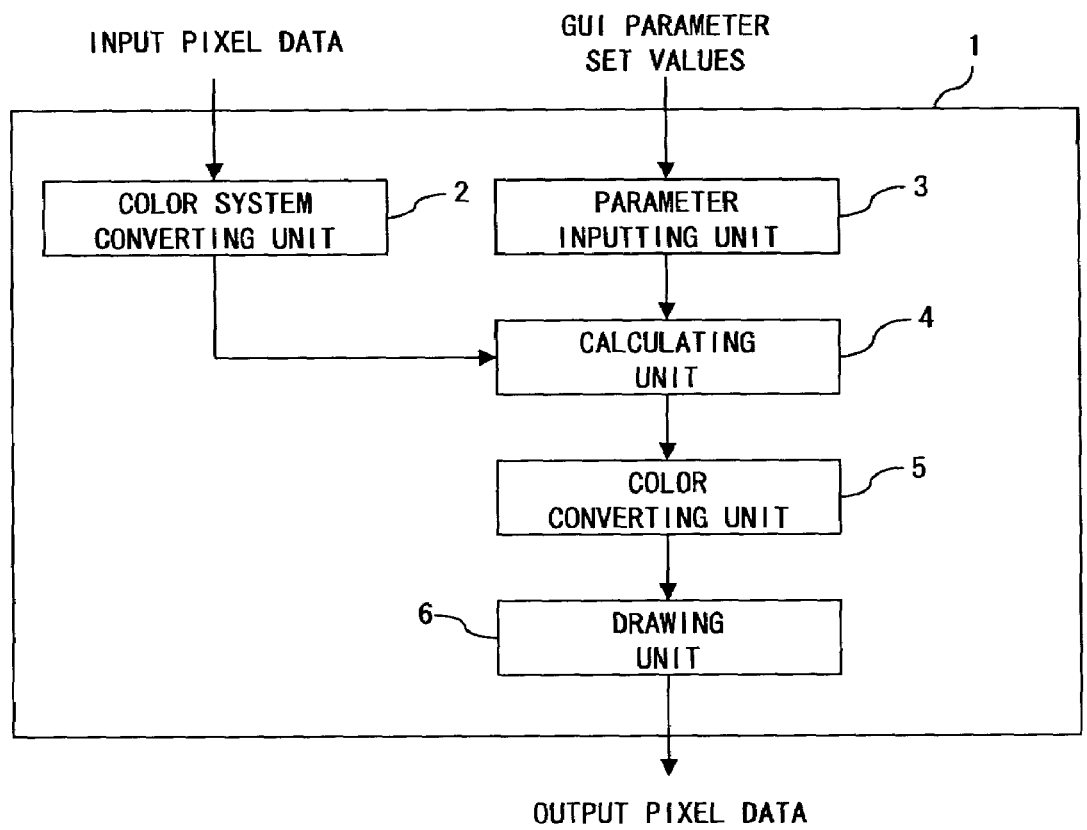
F I G. 4

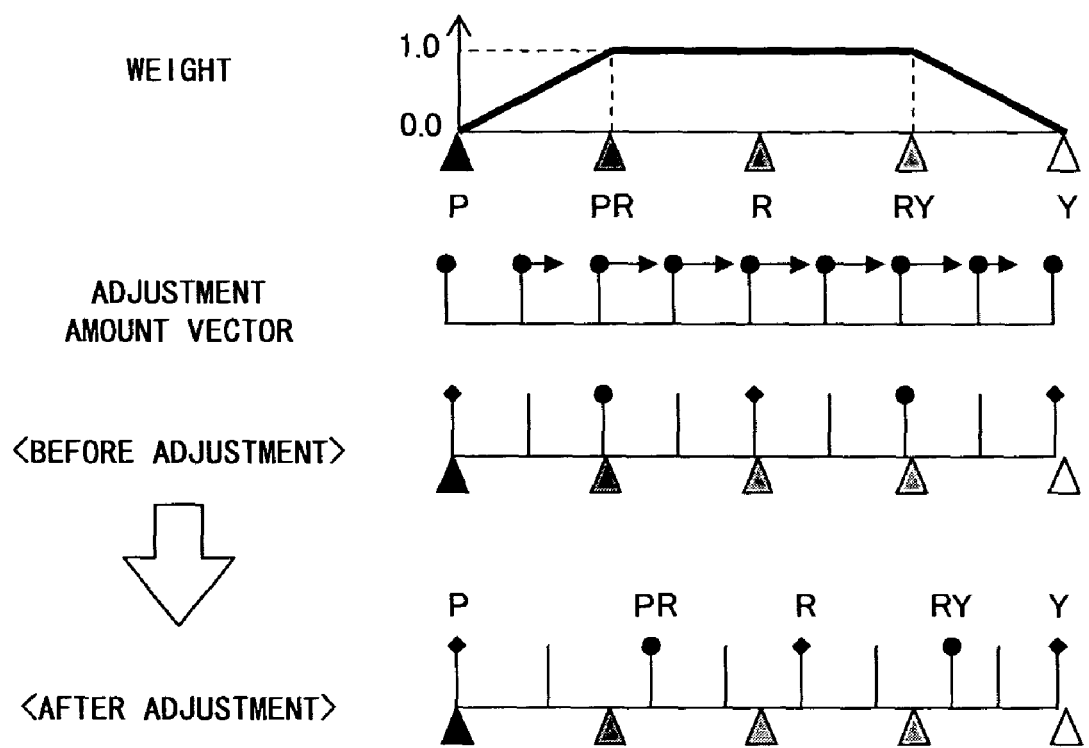
F I G. 7

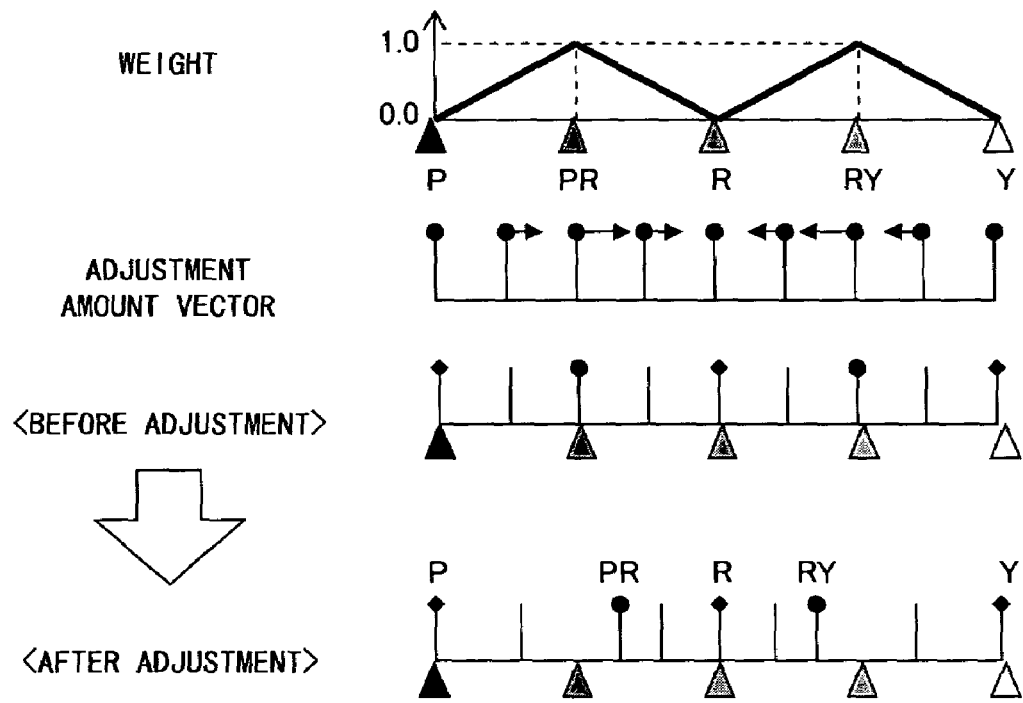
F I G. 8

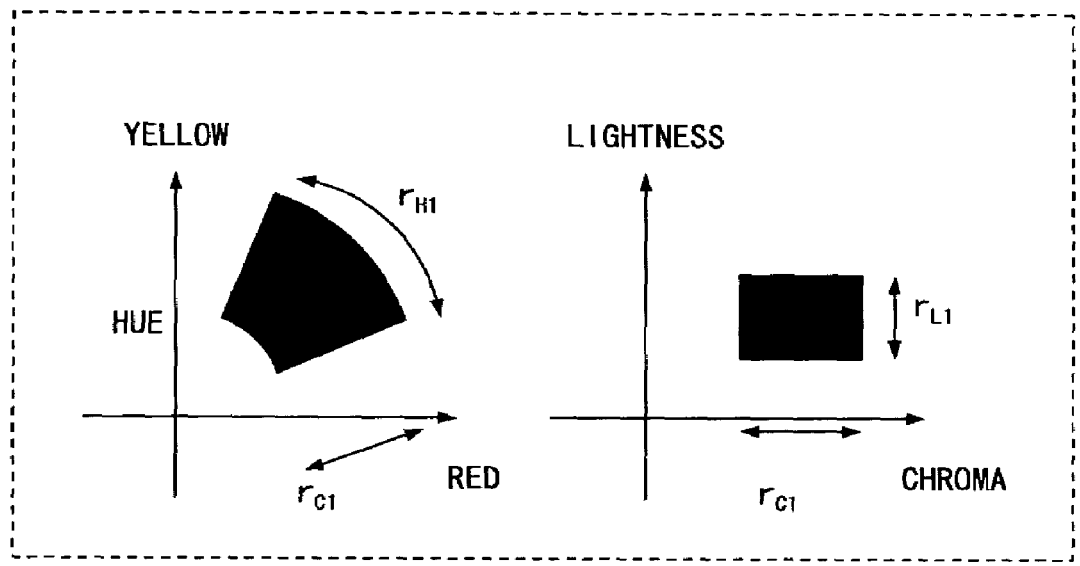
F I G. 9 A

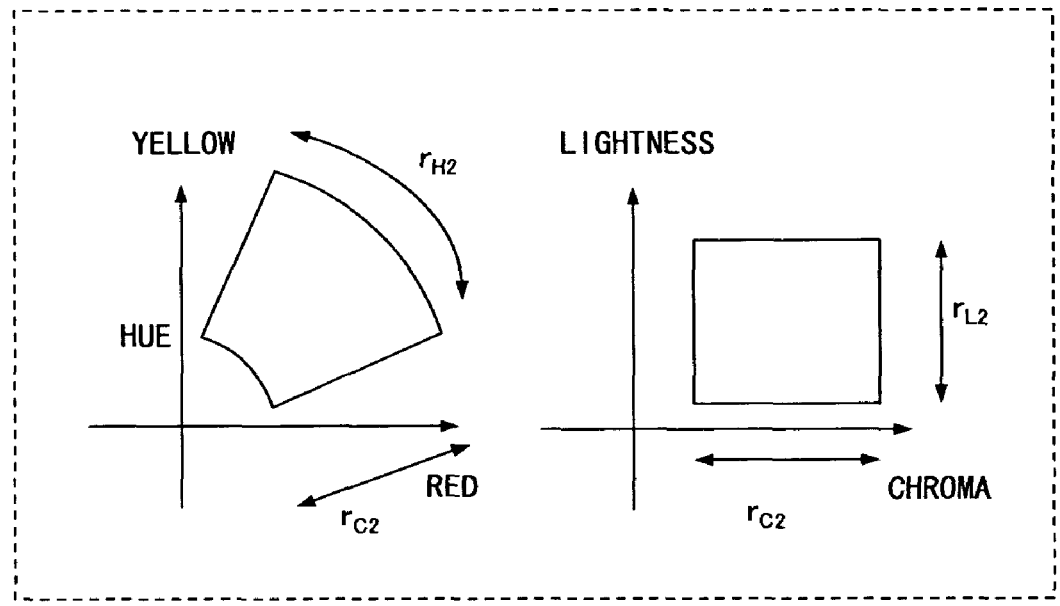
F I G. 9 B

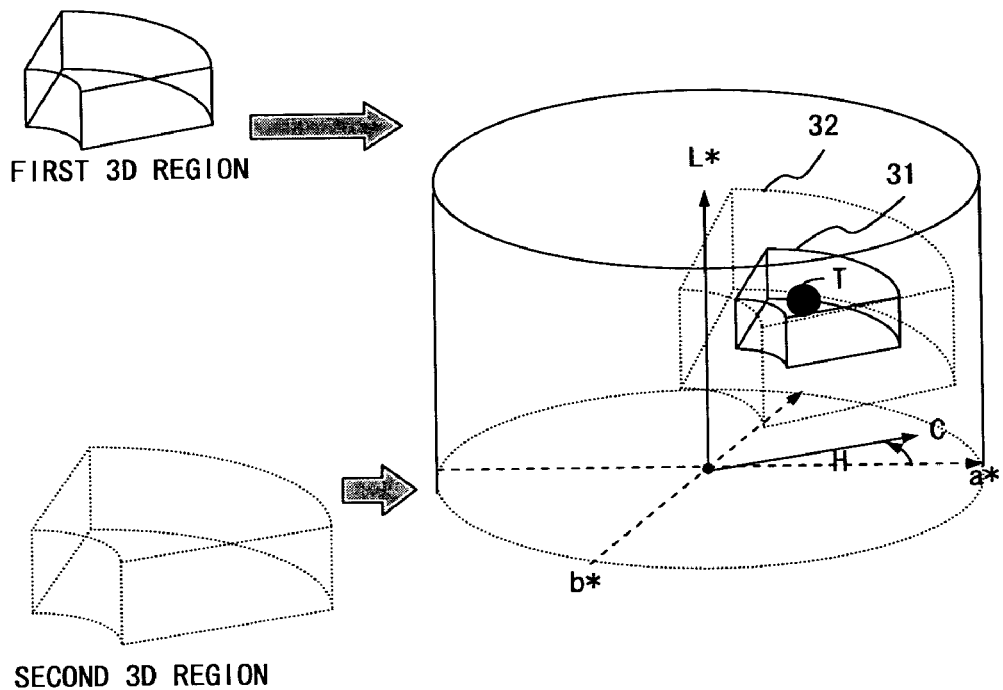
F I G. 9C

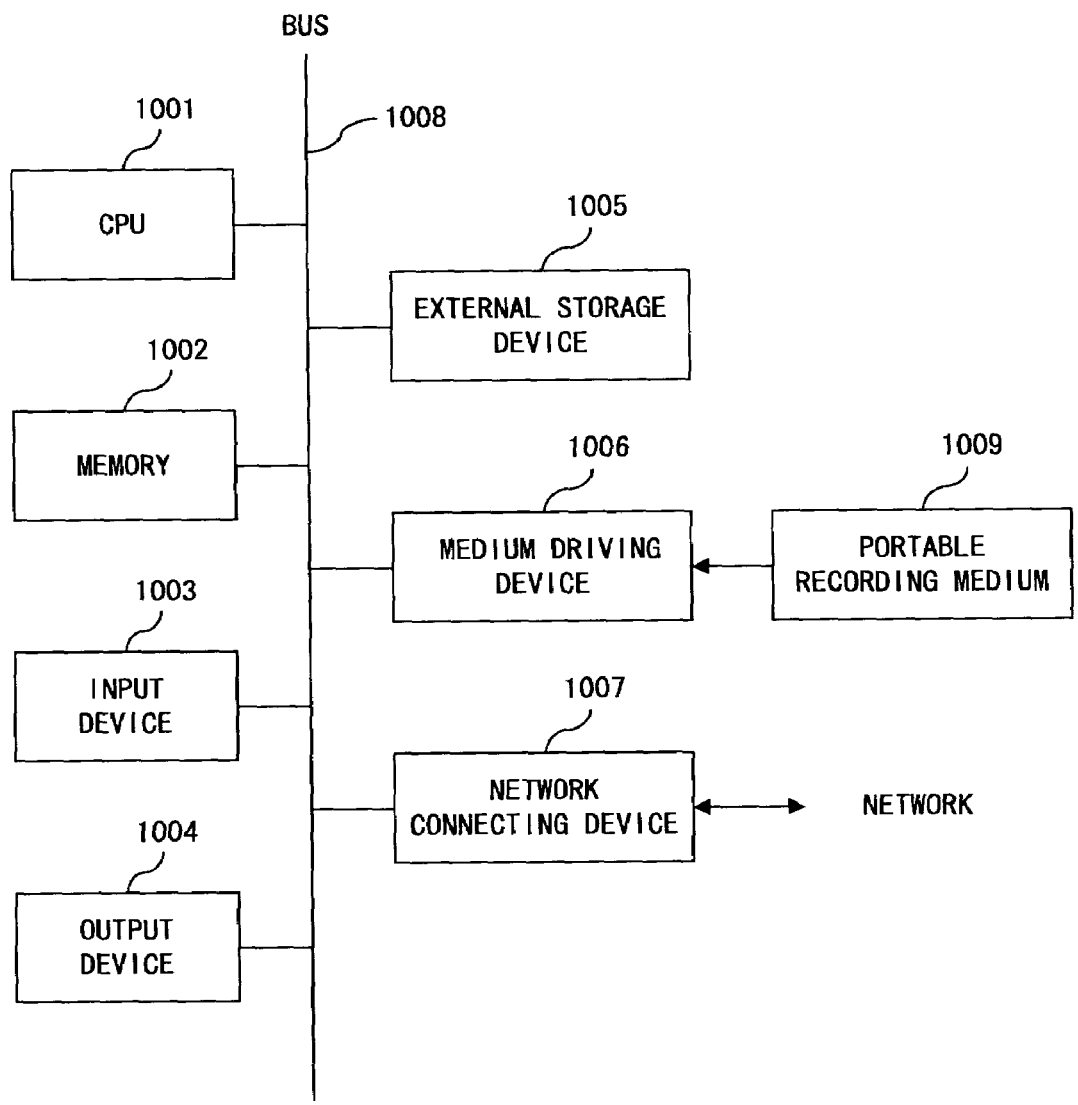
F I G. 1 3

RECORDING MEDIUM AND COLOR ADJUSTING APPARATUS

BACKGROUND OF THE INVENTION

1. Field of the Invention

The present invention relates to a technique for an image quality adjustment, and more particularly, to a technique for a color adjustment made by a user with a graphical interface.

2. Description of the Related Art

In an image quality adjustment of a television, a digital camera, etc., the demand for a color adjustment that a user can more freely make, such as the demand that a user freely adjusts the skin color of a person, green colors of plants and trees, etc. based on his or her preferences has been increasing.

For manual image quality adjustment techniques, a variety of techniques such as retouch software, etc. conventionally exist. As these color adjustment methods, a method with which a user specifies and one-dimensionally adjusts an arbitrary color respectively for lightness, chroma and hue, or a method with which a user specifies an arbitrary color in a two-dimensional display of chroma and hue are provided (for example, Patent Documents 1, 2 and 3). With these methods, changes in a target color to be adjusted before and after a correction can be presented to a user.

An example of a user interface for making a one-dimensional color adjustment is shown in FIG. 1A. If a yellowish hue is changed to a greenish hue via the user interface shown in FIG. 1A, a desired color adjustment can be made by specifically inputting the value of a hue to a text box to set the value.

FIG. 1B exemplifies a user interface for making a two-dimensional color adjustment. Via the user interface shown in FIG. 1B, a point indicated by an arrow in this figure is specified, for example, with a pointing device to simultaneously specify chroma and hue, and specific values are input to text boxes in the right portion of this figure, whereby a desired color adjustment can be made simultaneously for chroma and hue.

FIG. 2 is a schematic (No. 1) explaining a color adjustment method for 3 attributes according to a conventional technique. Adjustment ranges of lightness, chroma and hue are respectively specified for a region, which includes a target color to be adjusted, in the neighborhood of the target color, and a color adjustment is made to an arbitrary region including the target color to be adjusted.

FIG. 3 is a schematic (No. 2) explaining a color adjustment method for 3 attributes according to a conventional technique. With a color adjusting apparatus shown in FIG. 3, a target color to be adjusted is specified, and a lightness adjustment value, a chroma adjustment value, and a hue adjustment value are specified respectively for the values of the attributes, whereby a color adjustment can be made more flexibly.

[Patent Document 1] Japanese Published Unexamined Patent Application No. H8-321957

[Patent Document 2] Japanese Published Unexamined Patent Application No. 2003-125221

[Patent Document 3] Japanese Published Unexamined Patent Application No. 2003-250058

For example, with the technique disclosed by Patent Document 1, a color adjustment is made by adopting a matrix operation of a masking process. Therefore, the ranges of lightness and chroma cannot be specified when a color is selected. Namely, only a control for the range of hue can be implemented in the masking process.

Additionally, with the technique disclosed by Patent Document 2, the adjustment amounts of neighboring colors including a target color are made equal, and a control for gradually changing and reducing the adjustment amounts in order to smoothly maintain tones cannot be performed in the neighborhood of the boundary of an adjustment range. This leads to a problem that the degree of freedom of a control for the color adjustment is insufficient.

Furthermore, the technique disclosed by patent Document 3 has a problem that a control for setting adjustment values respectively for the adjustment values of the lightness, chroma and hue of a target color specified by a user becomes complex. Namely, adjustment values respectively for the lightness, chroma and hue must be set for the lightness of the target color, adjustment values respectively for the lightness, chroma and hue must be set for the chroma of the target color, and adjustment values respectively for the lightness, chroma and hue must be set for the hue of the target color. In this way, a user must perform operations for an adjustment by grasping 3×3=9 items, leading to the complexity of the control for the color adjustment. Accordingly, there is a problem that difficulties exist in the intuitive grasping of the state of the target color and the contents of the adjustment.

Furthermore, the color adjustment methods according to the conventional techniques do not comprise means with which a user grasps the states, which include states before and after an adjustment, of other colors positioned in the neighborhood of a target color to be adjusted, although the states of the target color before and after the adjustment can be presented to the user.

Accordingly, sudden color changes occur in the target color and its neighboring colors after an adjustment depending on the contents of the adjustment specified by a user, and problems such as contrast decrease, etc. occur. The conventional techniques, however, cannot predict these problems until an adjustment is made with the above described methods. Means for preparing a plurality of sample images including a plurality of colors, and for verifying the sample images by making a trial color correction conventionally exists. This method, however, requires procedures for setting adjustment values, for displaying a sample image on a screen after making a color adjustment based on the set values, for causing a user to verify whether or not a problem occurs in the output image, and for resetting the adjustment values if a problem occurs. This requires considerable amounts of labor and time.

SUMMARY OF THE INVENTION

An object of the present invention is to provide a technique for causing a user to easily view the states of colors after a correction and to easily issue an instruction of the contents of an adjustment by presenting to the user the states of not only a target color but also its neighboring colors, which are influenced by the color adjustment of the target color, before and after the color adjustment process, and for reducing the amounts of labor and time, which are required for the color adjustment.

To overcome the above described problems, a recording medium according to the present invention is a recording medium causing a computer to execute a color adjustment program used for an image quality adjustment. With this program, when information about a target color to be adjusted, the adjustment amount of the target color to be adjusted, and an adjustment range for deciding the range of colors to be adjusted along with the target color are input, weights are assigned to the adjustment amounts of colors included in the adjustment range in correspondence with a positional relationship with the target color in color space, and the adjustment amount of the target color, colors after the adjustment are calculated for the target color and the colors included in the adjustment range according to the weights, and a three-dimensional region corresponding to the calculated colors is drawn in the color space.

The color adjustment process goes a target color and colors within an adjustment range in the neighborhood of the target color, and adjustment amounts are determined by being assigned weights so that a boundary between the adjustment range and a range to which the adjustment is not made are naturally adjusted. Before the color adjustment is actually made, the states of colors when the color adjustment is made based on the target color specified by a user, the adjustment amount of the target color and the adjustment range are drawn as a three-dimensional region in color space. As a result, the states of the colors can be verified in the color space before the color adjustment is actually made, whereby the amounts of labor and time, which are required for the color adjustment, can be reduced.

In the three-dimensional region, colors after the adjustment may be drawn as a first three-dimensional region for the target color and colors included in a first adjustment range in the neighborhood of the target color within the adjustment range, and colors after the adjustment may be drawn as a second three-dimensional region for the colors included in a second adjustment range positioned outside the first adjustment range within the adjustment range. The neighborhood range of the target color and an adjustment range positioned outside the neighborhood region are made to appear respectively as the first and the second three-dimensional regions on a display, whereby a user can more easily verify the states of the colors after the adjustment.

Additionally, change amounts before and after the color adjustment may be calculated for the colors included in the first and the second three-dimensional regions, whether or not the calculated change amounts are suitable values may be determined, and a color the change amount of which is determined not to be a suitable value may be drawn as a third three-dimensional region in the color space. With the third three-dimensional region, a user can verify a loss of gradation beforehand if the color adjustment is made according to contents specified by the user.

Furthermore, a color the change amount of which is the same as a predetermined color among the colors included in the first and the second three-dimensional regions may be extracted before and after the color adjustment, and the extracted color may be drawn as a fourth three-dimensional region in the color space. The fourth three-dimensional region can be used when a user sets his or her desired value.

According to the present invention, a user can set suitable values by referencing various types of three-dimensional regions displayed in color space before actually making a color adjustment, whereby the amounts of labor and time, which are required for the color adjustment, can be reduced.

BRIEF DESCRIPTION OF THE DRAWINGS

FIG. 1A is a schematic (No. 1) showing a conventional user interface;

FIG. 4 is a function block diagram showing a color adjusting apparatus according to a preferred embodiment;

FIG. 7 is a schematic for explaining a shift process;

FIG. 8 is a schematic for explaining a centering process;

FIG. 9A is a schematic (No. 1) for explaining states after an adjustment for respective attributes;

FIG. 9B is a schematic (No. 2) for explaining states after an adjustment for the respective attributes;

FIG. 9C is a schematic exemplifying the output of first and second three-dimensional regions;

FIG. 13 is a block diagram showing the configuration of an information processing device.

DESCRIPTION OF THE PREFERRED EMBODIMENTS

Figure 1B:
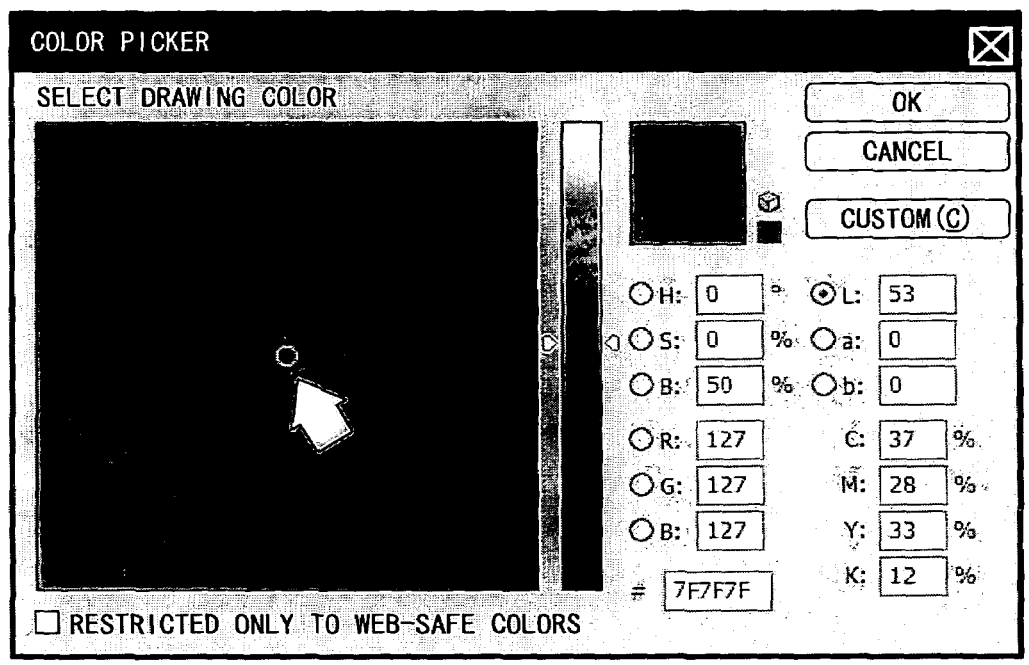
FIG. 1B is a schematic (No. 2) showing a conventional user interface.
Figure 2:
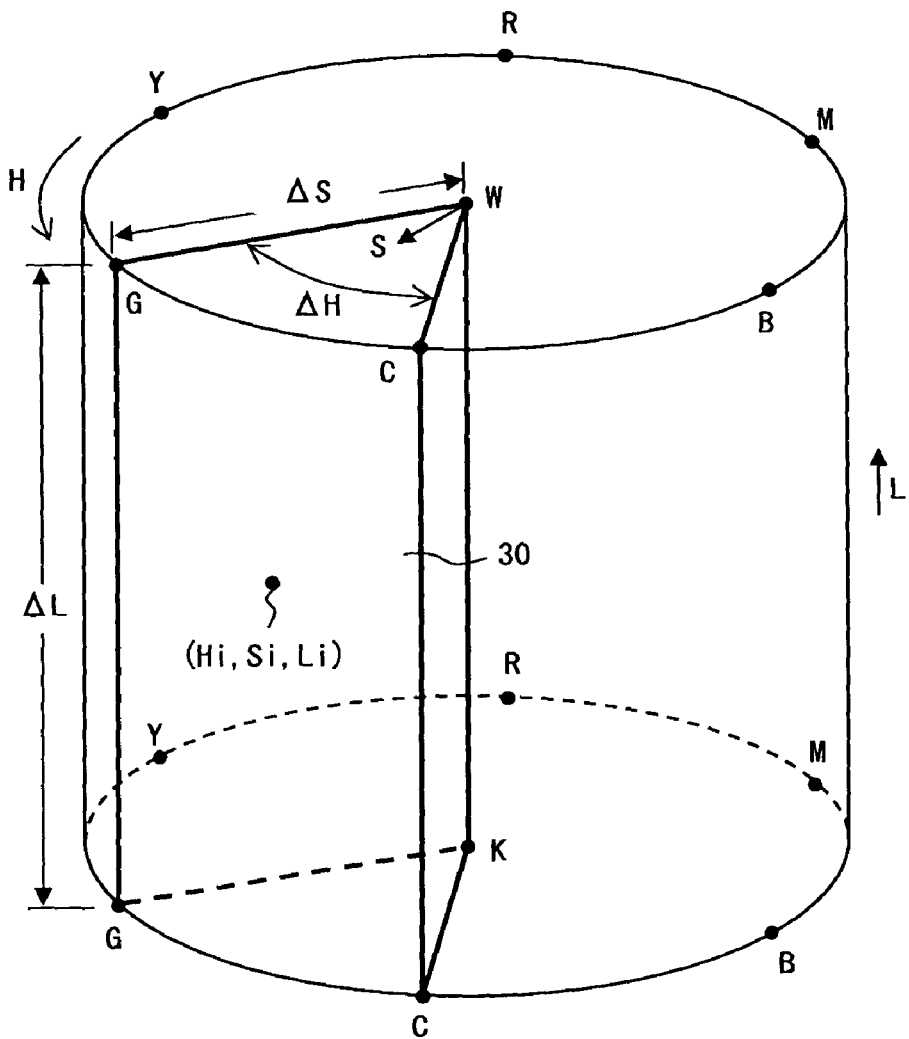
FIG. 2 is a schematic (No. 1) explaining a conventional color adjustment method.
Figure 3:
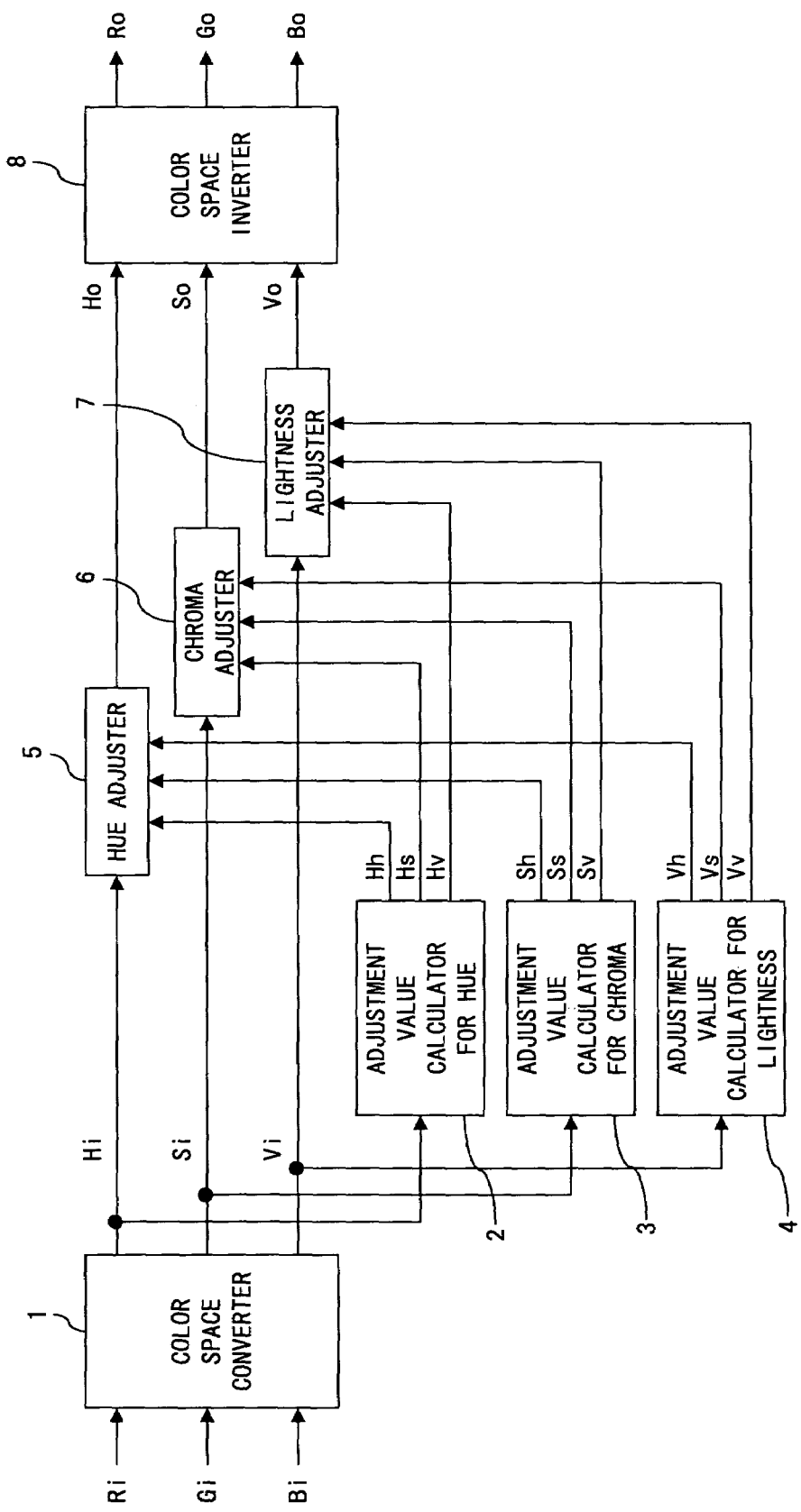
FIG. 3 is a schematic (No. 2) explaining a conventional color adjustment method.

Preferred embodiments according to the present invention are hereinafter described in detail with reference to the drawings.

FIG. 4 is a function block diagram showing a color adjusting apparatus according to a preferred embodiment. The color adjusting apparatus 1 is configured by comprising a color system converting unit 2, a parameter inputting unit 3, a calculating unit 4, a color converting unit 5 and a drawing unit 6.

The color system converting unit 2 converts input RGB image data into three attributes such as lightness L, chroma C and hue H. The parameter inputting unit 3 accepts information that a user inputs via a user interface. The calculating unit 4 calculates a weight required to perform a color adjustment process for each of the attributes based on the information input from the user. The color converting unit 5 calculates an adjustment color based on the weight obtained by the calculating unit 4. The drawing unit 6 draws a process result of the color converting unit 5 on a screen.

The color adjusting apparatus 1 is incorporated into an image system for adjusting the image quality of a color, such as a digital television, a video camera, a digital camera, a printer etc. Or, the color adjusting apparatus 1 is used as an external appliance by being connected to an image system. The color adjusting apparatus 1 can be also used as an application program used by being embedded into an image system.

The color adjusting apparatus 1 represents a color with the three attributes such as lightness L, chroma C and hue H, and expresses in a color space the states of colors, to which an adjustment specified by a user is made, for a target color to be adjusted and its neighboring colors. In this preferred embodiment, the states of colors are displayed in L*a*b* color space.

Figure 5:
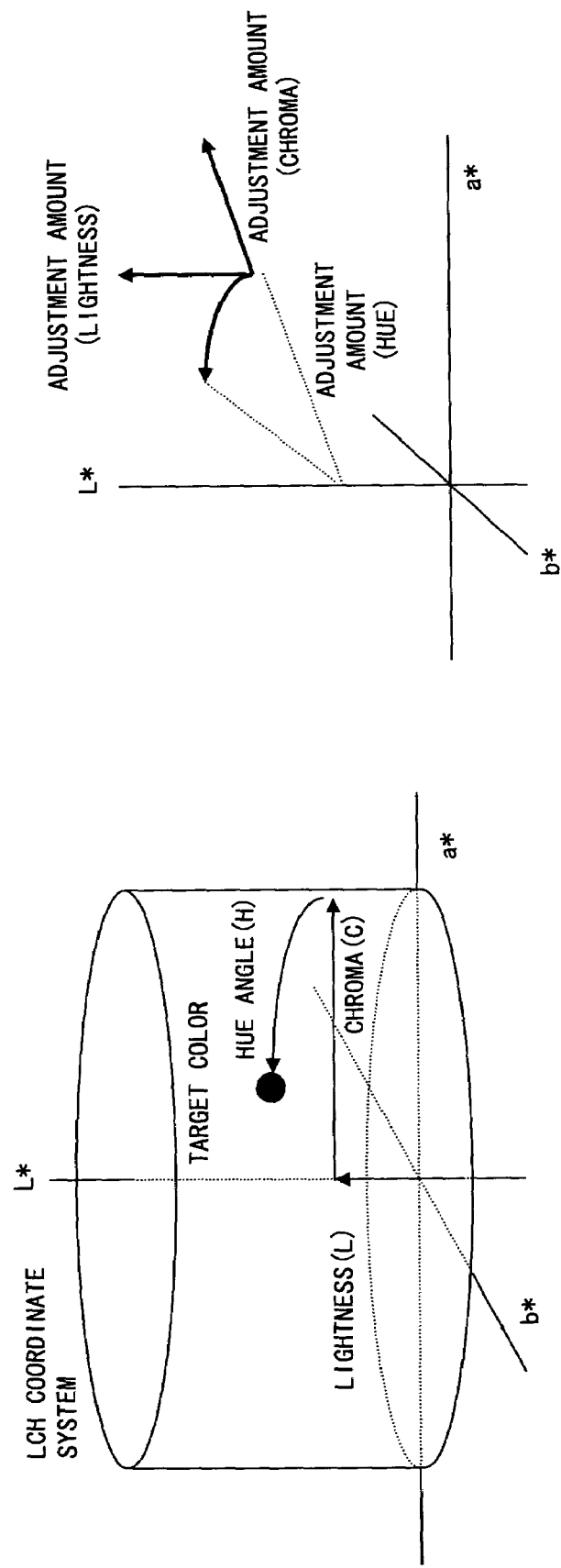
FIG. 5 is a schematic for explaining L*a*b* color space.

FIG. 5 is a schematic for explaining the L*a*b* color space. In this preferred embodiment, a color is represented with an LCH coordinate system of lightness L, chroma C and hue H. The LCH coordinate system is a coordinate system which converts the orthogonal coordinates of an a*b* plane into the polar coordinates of chroma C and hue H, and represents the converted coordinates in the L*a*b* color space. A color difference perceived by human eyes as an equal magnitude is represented by an equal distance in uniform color space such as the L*a*b* color space, etc. Namely, a user can easily verify whether or not the state of a color is suitable by checking the color displayed in the L*a*b* color space with his or her eyes.

Figure 6:
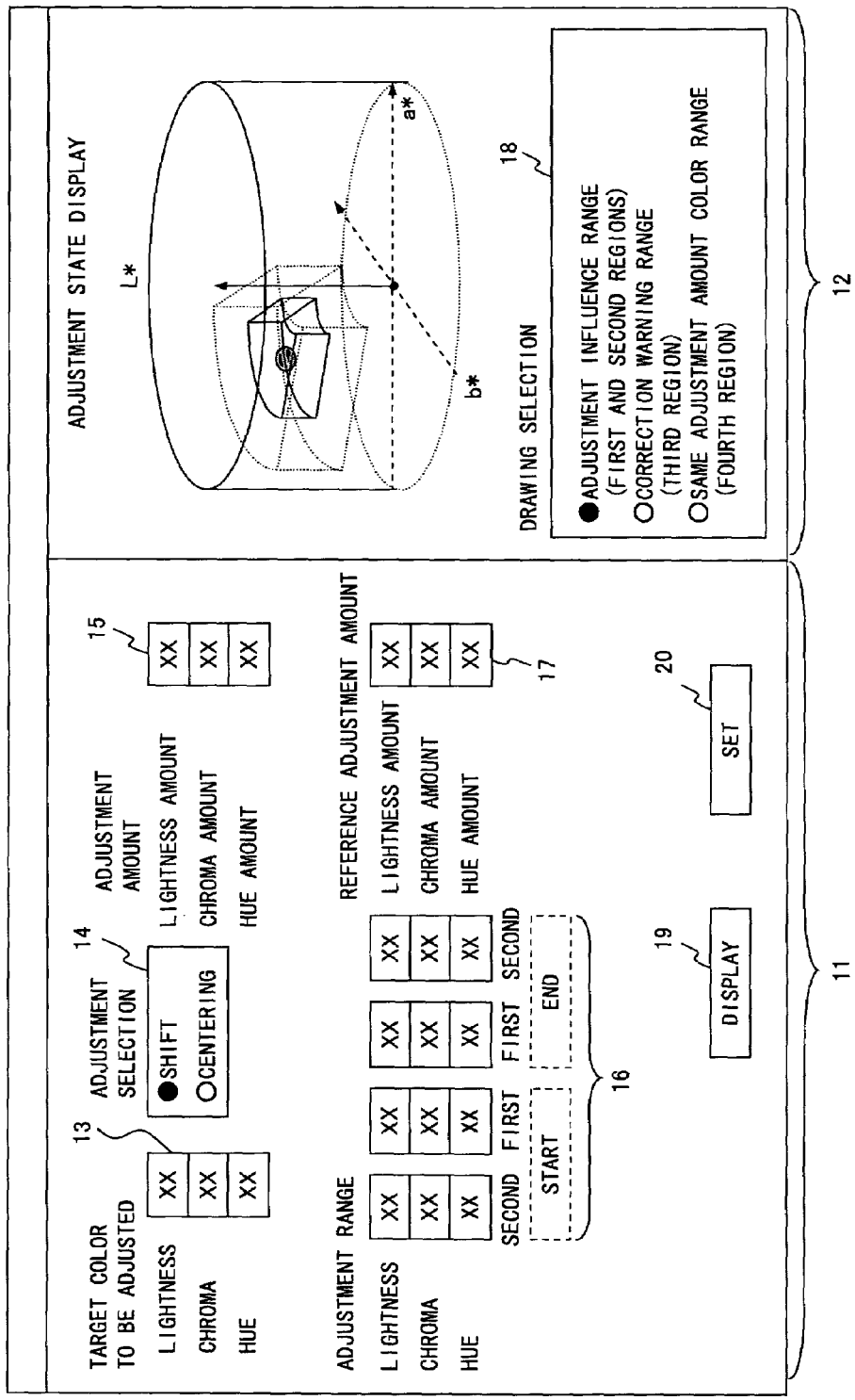
FIG. 6 is a schematic exemplifying a screen made to appear on a display.

FIG. 6 is a schematic exemplifying a screen made to appear on a display. The screen is configured by an input part 11 and an output part 12.

The input part 11 is configured by text boxes to which a user inputs information about a target color 13, an adjustment type 14, an adjustment amount 15, an adjustment range 16 and a reference adjustment amount 17. The output part 12 outputs states after a color adjustment, which is made according to the information of the input part 11, as various types of three-dimensional regions in L*a*b* color space. In the example shown in FIG. 6, the target color, and the first and the second three-dimensional regions are displayed. Its details will be described later. Drawing selection buttons 18 in the output part 12 are configured by radio buttons, etc. prepared to make a selection to output and display any of the various types of three-dimensional regions.

To the text box of the target color 13, information about lightness, chroma and hue for identifying the target color are input. To the adjustment type 14, a specific method for making a color adjustment to the target color 13 is input. In this preferred embodiment, either of two types such as an adjustment using a shift, and an adjustment using centering is selected with the radio button, etc. To the adjustment amount 15, the amount of an adjustment made to the target color 13 with the method indicated by the adjustment type 14 is input.

To the adjustment range 16, starting information and end information are input respectively for the attributes such as lightness, chroma and hue. The starting and the end information are information for limiting colors in the neighborhood of the target color 13. Colors included in the adjustment range 16 are targeted along with the target color 13 for a color adjustment made according to the adjustment type 14. To the reference adjustment amount 17, the values of the respective attributes used to reference a region, which satisfies a predetermined condition, among three-dimensional regions output to the output part 12 are input. Although details will be described later, a region, to which a correction of an equal amount is made, among the three-dimensional regions displayed in the color space as states after the correction is displayed by color coding according to the values input as the reference adjustment amount 17.

Additionally, a display button 19, a set button 20, etc. may be further provided on the screen. A user presses the display button 19 after inputting the predetermined items displayed in the input part 11, so that an adjustment result is displayed in the color solid of the output part 12. The user may actually make a color adjustment by pressing the set button 20 when the user sets a color according to the contents that he or she inputs after verifying the adjustment result.

Otherwise, a screen for allowing a user to input a target color to be adjusted, an adjustment range, etc. by referencing a sample image may be provided. In this case, the user specifies the target color with input means such as a pointing device, etc. Also an adjusted color may be output through a sample image.

In the example of the screen shown in FIG. 6, the input part 11 and the output part 12 are simultaneously presented to a user. However, the screen display is not limited to this configuration. For example, only the input part 11 may be displayed in the initial state, switching may be made to the display of the color solid in the output part 12 with the press of the button made by a user after the user inputs the values of the parameters, and switching may be again made to the display of the input part 11 according to an input from a pointing device, etc.

FIG. 7 is a schematic for explaining a shift process. The example shown in this figure exhibits the process for shifting hue among the three attributes. Specifically, it is assumed that the target color to be adjusted is "red", the adjustment amount is "X° in yellow direction", and the adjustment range is "purple to yellow".

With the shift process, a color close to the target color red is shifted in the yellow direction by X° by being assigned the same weight as the target color. In the meantime, the shift amount of a color relatively far from the target color among colors included in the adjustment range is made small. In this preferred embodiment, the adjustment amount is zero in a boundary between the adjustment range and the outside of the adjustment range, namely, the hue is not adjusted as shown in FIG. 7. According to an adjustment amount vector, which displays the direction and the magnitude of an adjustment, a shift is made in the right direction over the entire adjustment range, namely, from purple (P) to yellow (Y), and the amount of shift from red purple (PR) to orange (RY) before the adjustment is the same as the target red (R). In regions from purple (P) to red purple (PR) and from orange (RY) to yellow (Y), a shift the amount of which is the same as the target color is made at red purple (PR) and orange (RY), and a shift the amount of which is zero is made at purple (P) and yellow (Y), which are the boundaries of the adjustment range.

FIG. 8 is a schematic for explaining a centering process. The example shown in this figure exhibits a process for centering hue among the three attributes. Specifically, it is assumed that the target color to be adjusted is "red", "the maximum hue is X°" for the adjustment amount, and the adjustment range is "purple to yellow".

With the centering process, the target color red is not moved. Weights are assigned so that the adjustment amounts of red purple (PR) and orange (RY) become the maximum, and the adjustment amounts of purple (P) and yellow (Y), which are the boundaries between the adjustment range and the outside of the adjustment range become zero within the adjustment range from purple (P) to yellow (Y). An example of assigning weights is shown in FIG. 8. The weights of red purple (PR) and orange (RY), the adjustment amounts of which become the maximum, are set to 1.0, and the weights of purple (P), red (R) and yellow (Y), the adjustment amounts of which become zero, are set to 0.0. For colors positioned in between, their adjustment amounts are set not to suddenly change between contiguous colors.

All of the adjustment amount vectors are directed toward the target red (R), and their magnitudes are set so that an adjustment amount becomes larger as a color is closer to red purple (PR) and orange (RY), the adjustment amounts of which are the maximum, and an adjustment amount becomes smaller (a value becomes closer to zero) as a color is closer to the target red (R), and purple (P) and yellow (Y), which are the boundaries.

As shown in FIGS. 7 and 8, the color adjustment process does not set a uniform adjustment amount over the entire adjustment range, but performs a control for changing the adjustment amount for a predetermined range within the adjustment range. This is because a sudden tone difference occurs after a color adjustment is made in the neighborhood of boundaries (in the neighborhood of purple (P) and yellow (Y) in the above example) if the same adjustment amount is set over the entire adjustment range, and problems such as an occurrence of a contrast decrease in lighter direction, etc. of an image are posed. By reducing the adjustment amount in stages (at a constant change rate in the preferred embodiment) as a color becomes closer to the boundary of an adjustment range, a contrast decrease in lighter direction, etc. in the neighborhood of the boundary of the adjustment range is difficult to occur.

FIGS. 9A, 9B, and 9C show the output examples of the first and the second three-dimensional regions. Changes in colors before and after a color adjustment are represented by an LCH coordinate system. Initially, a state after the color adjustment for the boundaries of the range specified as colors in the neighborhood of the target color is displayed as the first three-dimensional region in L*a*b* color space. Then, a state after the color adjustment for the boundaries of the adjustment range is displayed as the second three-dimensional region in the L*a*b* space.

If the color adjustment is made with the shift process shown in FIG. 7, a region shifted by being assigned the weight of 1.0, namely, the region from red purple (PR) to orange (RY) corresponds to the first three-dimensional region. In the meantime, regions shifted by being assigned a weight of less than 1.0, namely, the regions from purple (P) to red purple (PR) and from orange (RY) to yellow (Y) correspond to the second three-dimensional region.

If the color adjustment is made with the centering process shown in FIG. 8, a region sandwiched by red purple (PR) and orange (RY), the weights of which are 1.0, namely, the adjustment amounts of which are the maximum, corresponds to the first three-dimensional region. In the meantime, the regions from purple (P) to red purple (PR) and from orange (RY) to yellow (Y) inside the adjustment range and outside the first three-dimensional region correspond to the second three-dimensional region.

As described above, since an adjustment target has a breadth for each of the attributes, also lightness, chroma and hue which are obtained with the color adjustment have breadths respectively. FIGS. 9A and 9B are schematics explaining the states of the respective attributes after an adjustment. FIG. 9A is a schematic showing the states of the respective attributes after the adjustment is made to the neighborhood of the target color. Lightness, chroma, and hue have breadths $r_{L1}$, $r_{C1}$ and $r_{H1}$ respectively. FIG. 9B is a schematic showing the states of the respective attributes after the color adjustment is made to the entire adjustment range including the target color and its neighborhood. Lightness, chroma and hue have breadths $r_{L2}$, $r_{C2}$ and $r_{H2}$ respectively. If the states of the colors after the adjustment, which are shown in FIGS. 9A and 9B, are represented by color solids, they will become as shown in FIG. 9C.

In FIG. 9C, the target color T, the first three-dimensional region 31 and the second three-dimensional region 32 are output and displayed. The boundaries of the first three-dimensional region are displayed with solid lines, and the boundaries of the second three-dimensional region are displayed with dotted lines in a perspective manner. By displaying the three-dimensional regions in a perspective manner, a user can easily verify the broadening of colors in color space for the colors after the adjustment within the adjustment range.

Operations for displaying the first and the second three-dimensional regions are specifically described.

Initially, a user specifies a target color, a color adjustment type, an adjustment amount, and a range of the color to be adjusted via the user interface shown in FIG. 6.

For the target color T to be adjusted, the values of attributes such as lightness, chroma and hue are input to the text boxes of the target color 13. Here, assume that the coordinates of the color solid of the target color T are T(Lt, Ct, Ht).

For the color adjustment type, the user selects either of shift and centering by using the radio button, etc. of the adjustment type 14 shown in FIG. 6. Here, explanation is provided by taking as an example a case where the shift process is selected.

As the adjustment amount when the shift process is performed, desired values for the respective attributes are input to the text boxes of the adjustment amount 15 shown in FIG. 6. Here, the input values are assumed to be the adjustment amount d(Ld, Cd, Hd).

For the range of the color to be adjusted when the shift process is performed, a user inputs to the text boxes of the adjustment range 16 shown in FIG. 6 desired values for the respective attributes as the starting and the end colors of the adjustment respectively for the first and the second three-dimensional regions. When the shift process is performed, the starting and the end colors are assumed to be respectively (Ls1, Cs1, Hs1) and (Le1, Ce1, He1) for the adjustment range R1 of the first three-dimensional region, and the starting and the end colors are assumed to be respectively (Ls2, Cs2, Hs2) and (Le2, Ce2, He2) for the adjustment range R2 of the second three-dimensional region.

Next, colors after the adjustment are calculated based on the input information. A color focused to calculate a color after the adjustment among the colors included in the adjustment ranges R1 and R2 is assumed to be the focused color N(Ln, Cn, Hn), and a color after the adjustment of the focused color N is assumed to be N'(Ln', Cn', Hn'). The color N' after the adjustment is given by the following equations with the adjustment amount dn(Ldn, Cdn, Hdn) calculated for the focused color N.

$$Ln'=Ln+Ldn$$

$$Cn'=Cn+Cdn$$

$$Hn'=Hn+Hdn \qquad (1)$$

With the shift process, an adjustment the amount of which is the same as the adjustment amount d of the target color T is made to the colors included in the adjustment range R1 as already described with reference to FIG. 7. The adjustment amount dn, to which a weight is assigned in stages, is set for the colors outside the adjustment range R1 and inside the adjustment range R2 so that the adjustment amount becomes small (such as zero) at the boundaries of the adjustment range R2, namely, the starting and the end colors of the adjustment range R2. In this preferred embodiment, a function $f_L(x_L)$, which assigns a weight to lightness L among the three attributes, is defined as follows. Assume that a variable $x_L$=Ldn (the adjustment amount for the lightness Ln of the target color N).

$$\begin{cases} f_L(x_L) = \frac{|x_L - Ls2|}{|Ls2 - Ls1|} \times Ld & (Ls2 \leq x < Ls1) \\ f_L(x_L) = Ld & (Ls1 \leq x < Le1) \\ f_L(x_L) = \frac{|x_L - Le2|}{|Le2 - Le1|} \times Ld & (Le1 \leq x < Le2) \end{cases} \qquad (2)$$

The weight obtained with the equations (2) is multiplied with the adjustment amount Ld of the target color T, whereby the adjustment amount Ldn=Ld×$f_L(x_L)$ of the target color N is obtained. The obtained adjustment amount Ldn is substituted for the above provided equations (1), so that lightness Ln' after the adjustment is obtained.

Also to chroma Cn and hue Hn, weights are assigned based on predefined functions $f_c(x)$ and $f_H(x)$, adjustment amounts Cdn and Hdn are acquired based on the obtained weights, and the acquired adjustment amounts are substituted for the equations (1), so that chroma Cn' and hue Hn' after the adjustment are obtained.

As described above, the colors after the adjustment are obtained from the equations (1) and (2) respectively for the colors within the adjustment range, the colors included in the adjustment range R1 are displayed as the first three-dimensional region, and the colors outside the adjustment range R1 and inside the adjustment range R2 are displayed as the second three-dimensional region.

By outputting and displaying the first and the second three-dimensional regions in L*a*b* color space, a user can easily verify colors when an adjustment, the amount of which is specified with a method designated by a user is made, for the target color and its neighboring colors. As a result, the amounts of labor and time, which are required for the color adjustment, can be reduced.

Figure 10:
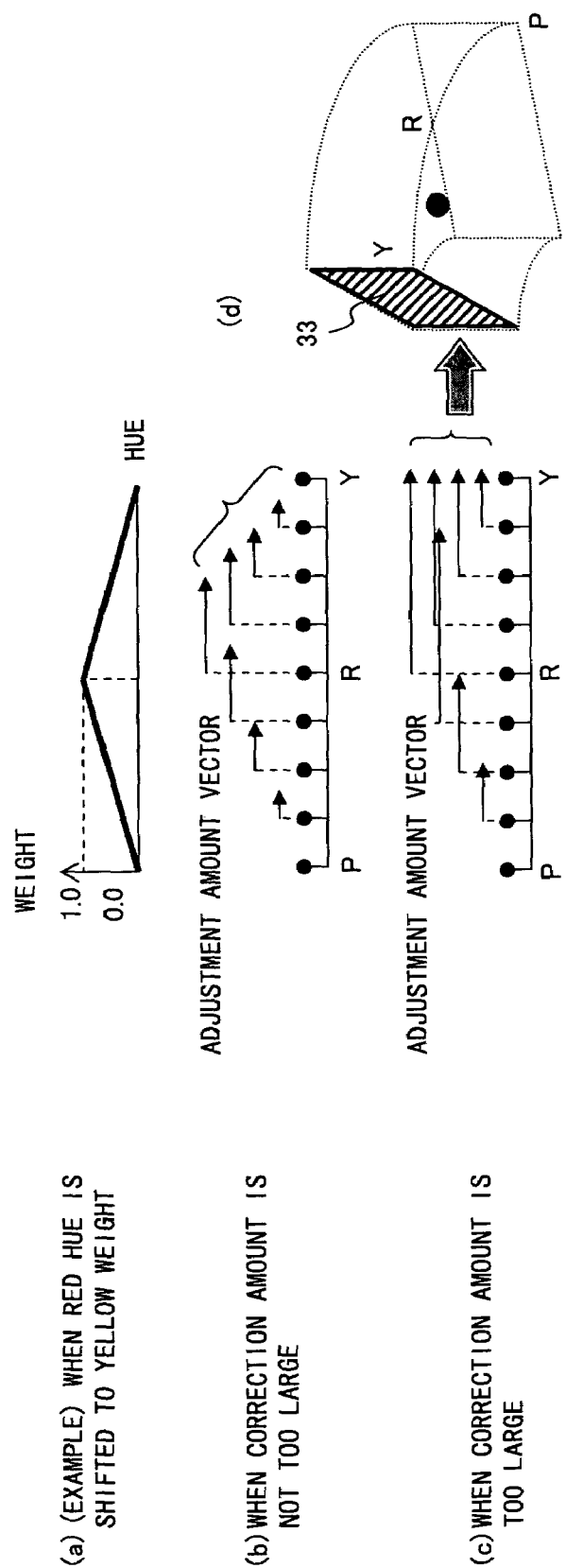
FIG. 10 is a schematic for explaining a third three-dimensional region.

FIG. 10 is a schematic for explaining the third three-dimensional region. Here, a method for outputting and displaying as the third solid region a region where a contrast decrease is caused by the shift process is described. Here, explanation is provided by taking as an example a case where a color adjustment for shifting the hue of red (R) in yellow (Y) direction is made.

FIG. 10(a) is a graph showing a relationship between hue and a weight. For ease of explanation, only the weight of the target color (R) is assumed to be 1.0 for the weight of the shift. Also assume that the weights of colors other than the target color and colors of boundaries are increased in stages at a rate of 1.0/{(the hue of target color)−(the minimum value of the hue in an adjustment range)} if the value of the hue is smaller than the target color, or the weights are decreased in stages at a rate of −1.0/{(the maximum value of hue in an adjustment range)−(the hue of target color)} if the value of hue is larger than the target color.

FIG. 10(b) schematically shows adjustment amount vectors and hue after an adjustment when an adjustment amount input by a user is suitably set. Even after a shift is made in the yellow (Y) direction for the hue, tones are maintained also between red (R) and yellow (Y).

In the meantime, FIG. 10(c) schematically shows adjustment amount vectors and hue after an adjustment when an adjustment amount input by a user is too large. Since the adjustment amount is too large at the time of a shift made in the yellow (Y) direction for the hue, tones maintained before the adjustment are proved to be lost as a result of the shift process in a region close to yellow (Y) in the adjustment range.

As described above, if a user makes a color adjustment according to values that he or she inputs via the user interface shown in FIG. 6, smooth tones cannot be maintained in actual image conversion in some cases. The reason is, for example, that the adjustment amount specified by the user is too large. However, even if states after the adjustment are represented in color space as the first and the second three-dimensional regions, whether or not a contrast decrease, etc. actually occurs cannot be verified in these three-dimensional regions.

Accordingly, the change rate of a color before and after a color adjustment is used. If a calculated change rate is small, it is detected that a contrast decrease in darker direction is caused by the color adjustment. Or, if the change rate is large, it is detected that a contrast decrease in lighter direction is caused by the color adjustment. A region where the contrast decrease in darker or lighter direction is detected is output and displayed as the third three-dimensional region in the color solid in a color or by a drawn line, which is different from the first and the second three-dimensional regions.

FIG. 10(d) exemplifies the output of the third three-dimensional region 33. In the example shown in FIG. 10(d), the occurrence of the contrast decrease on the yellow (Y) hue plane of the second three-dimensional region is indicated as an alarm by color coding, etc. In this preferred embodiment, a case where a section is represented as a plane in color space is shown as an example of a three-dimensional region where tones are lost.

As described above, it is determined whether or not the color N' after the adjustment is included in the second three-dimensional region for the target color N on the surface of the solid decided by the adjustment range R1, and a color which is not included in the second three-dimensional region is output and displayed as the third three-dimensional region.

Operations for displaying the third three-dimensional region are specifically described.

For a color configuring the boundary of the adjustment range R1, namely, a point N on a plane configuring the surface of the solid region decided by the adjustment range R1, it is determined whether or not N' among colors after the adjustment, which are obtained with the above equations (1) and (2), is included in the adjustment range R2. A specific determination method for lightness among the three attributes is described.

The following determinations of the lightness Ln' after an adjustment when Ld≧0, namely, when the adjustment to increase the lightness is made, are made for the adjustment amount Ld of the lightness of the target color based on a magnitude relation with the lightness Ln before the adjustment, and/or Le2 for deciding the adjustment range R2.

(1) If Ln≦Ln'<Le2, the adjustment is normal.

(2) If Ln'=Le2, the adjustment is too much and tones are lost.

(3) If Le2<Ln', the adjustment is further too much than (2) and tones are reversed.

Colors corresponding to the above (2) and (3) are output as the third three-dimensional region by color coding, etc., because tones are lost.

Or, if the lightness Ln' after the adjustment is close to the lightness Le2 of the end color of the adjustment range R2, it is determined that the adjustment is too much. Therefore, a predetermined threshold value Th may be set. The determination is made according to a magnitude relation between Ln'−Le2 and the threshold value Th, whereby a contrast decrease in darker or lighter direction, which is caused by the color adjustment, can be detected more reliably. Conditional expressions used to make the determination when the threshold value is used are as follows.

(1) If Ln'≦Le2 and Th<|Ln'−Le2|, the adjustment is normal.

(2) If Ln'≦Le2 and |Ln'−Le2|≦Th, the adjustment is too much and tones are lost.

(3) If Le2<Ln', the adjustment is further too much than (2) and tones are reversed.

By displaying the third three-dimensional region, a user can easily verify a region where tones are lost when he or she makes a color adjustment according to his or her specified contents, and the amounts of labor and time, which are required to make the color adjustment with suitable values, can be reduced.

Figure 11:
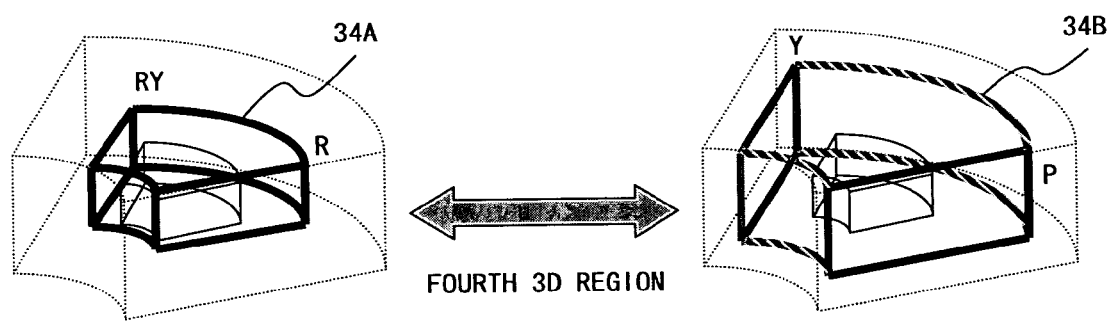
FIG. 11 is a schematic for explaining a fourth three-dimensional region.

FIG. 11 is a schematic for explaining a fourth three-dimensional region. A color to which the same adjustment amount is given among colors included in the first and the second three-dimensional regions, namely, colors included in the adjustment range is output and displayed as the fourth three-dimensional region in order to make a user view the color easily.

Specifically, a region corresponding to information input to the reference adjustment amount 17 among the items displayed in the input part 11 shown in FIG. 6 is output as the fourth three-dimensional region by color coding, etc. According to the values input to the reference adjustment amount 17, for example, a three-dimensional region shown on the right side or the left side of FIG. 11 is displayed.

Operations for displaying the fourth three-dimensional region are specifically described.

Change amounts in the respective components of the color N(Ln, Cn, Hn) before an adjustment and the color N' after the adjustment are examined, and all of colors E equal to the change rate dr(Ldr, Cdr, Hdr) specified with the parameter inputting unit 3 are extracted. A conditional expression is as follows. Colors E, which satisfy the following expression (3), are output and displayed as the fourth three-dimensional region by color coding. According to the values input by a user, for example, the fourth three-dimensional region 34A, which is indicated by thick lines on the left side of FIG. 11, is output. If other values are specified, the fourth three-dimensional region 34B, which is indicated by thick lines on the right side of FIG. 11, is output.

$$Ldr=|Ln-Ln'| \text{ and } Cdr=|Cn-Cn'| \text{ and } Hdr=|Hn-Hn'| \quad (3)$$

Colors the change amounts of which are the same as a result of the color adjustment process are output as the fourth three-dimensional region on the screen, whereby a user can use this region to make the color adjustment by setting desired values.

Figure 12:
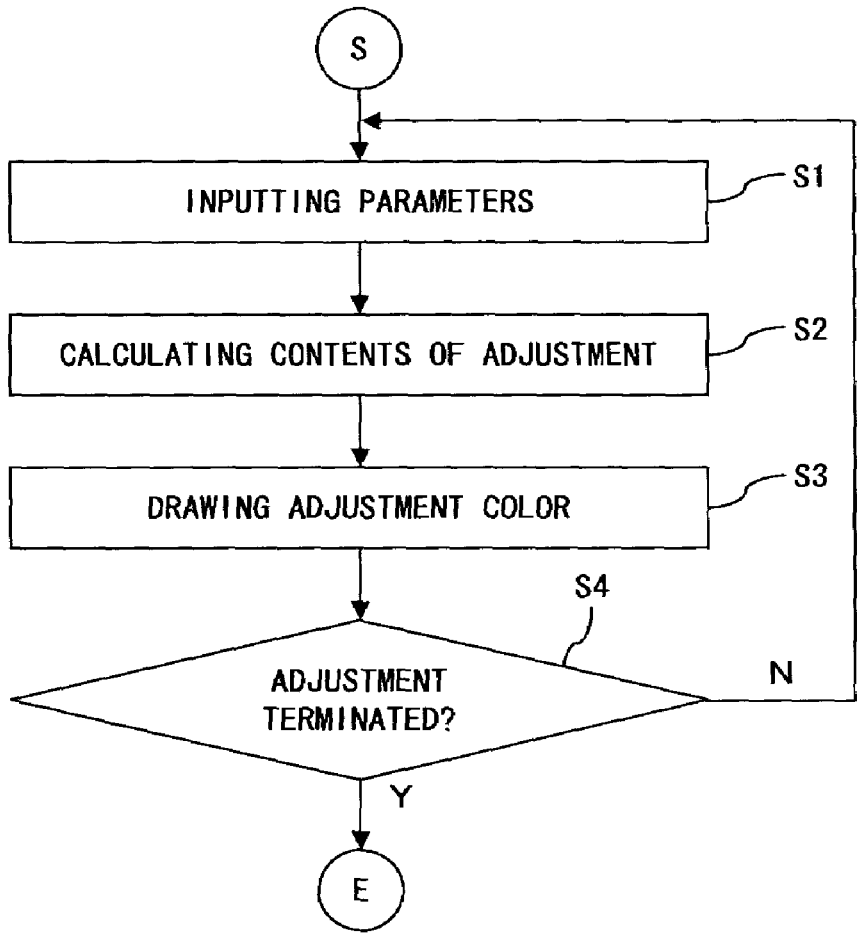
FIG. 12 is a flowchart showing a series of operations for drawing a three-dimensional region on a screen.

FIG. 12 is a flowchart showing a series of operations for drawing a solid region on the screen. The process shown in FIG. 12 is started, for example, at the timing when a program for executing the process is invoked and the screen shown in FIG. 6 is displayed.

Initially, in step S1, various items of information that a user inputs via the input part 11 of the screen are accepted by the parameter inputting unit 3. In step S2, values after a color adjustment are calculated based on the input items of information. The process for calculating values after the color adjustment includes the process represented by the above expressions (1) and (2), namely, the process for assigning a weight based on an adjustment range. Then, in step S3, a three-dimensional region is drawn on the screen based on the calculated colors after the adjustment. In step S4, it is determined whether or not to terminate the color adjustment process. If it is determined to terminate the color adjustment process, the process is terminated. If it is determined not to terminate the color adjustment process, the flow goes back to step S1. Here, the color adjustment process is determined to be terminated, for example, when the user actually makes the color adjustment based on his or her specified values with the press of the set button 20 shown in FIG. 6.

The flowchart shown in FIG. 12 represents the process for outputting and displaying the first and the second three-dimensional regions. The attributes of a target color, an adjustment type and an adjustment range correspond to the parameters accepted in step S1. Additionally, the process for calculating a color after an adjustment by assigning a weight based on the contents of the adjustment specified by the user corresponds to the contents calculated in step S2. By changing the parameters and the calculated contents, these steps correspond to the process for outputting the third or the fourth three-dimensional region.

As the process for drawing the third three-dimensional region, information indicating that the "correction warning range (the third region)" among the drawing selection buttons 18 shown in FIG. 6 is selected is accepted in step S1, and a process for comparing each color after the adjustment with the adjustment range is performed in step S2. As the process for drawing the fourth three-dimensional region, values input to the text boxes of the reference adjustment amount 17 shown in FIG. 6 are accepted in step S1, and a process for extracting a color, which satisfies the above expression (3), is performed in step S2.

As described above, with the color adjusting apparatus 1 according to this preferred embodiment, a user specifies not only a target color but also colors in the neighborhood of the target color as an adjustment range. Additionally, a color adjustment using a specified method is made by assigning weights so that tones in boundaries between the inside and the outside of the adjustment range become continuous naturally. Then, information, which the user requires at the time of the color adjustment, such as the state of a color after an adjustment, a portion where tones are lost, a region the adjustment amount of which is equal, and the like are output as the first to the fourth three-dimensional regions in color space. In consequence, the user can make the color adjustment after verifying on a screen the results of the color adjustment process performed based on his or her input information, before actually making the color adjustment. The state after the adjustment is output on the screen before the color adjustment is actually made, whereby the amounts of labor and time, which are required to make the color adjustment, can be reduced.

Incidentally, the color adjusting apparatus 1 shown in FIG. 4 can be configured, for example, with an information processing device (computer) shown in FIG. 13. The information processing device shown in FIG. 13 comprises a CPU (Central Processing Unit) 1001, a memory 1002, an input device 1003, an output device 1004, an external storage device 1005, a medium driving device 1006, and a network connecting device 1007, which are interconnected by a bus 1008.

The memory 1002 includes, for example, a ROM (Read Only Memory), a RAM (Random Access Memory), etc., and stores a program and data, which are used for processes. The CPU 1001 performs necessary processes by executing the program with the memory 1002.

The color system converting unit 2, the parameter inputting unit 3, the calculating unit 4, the color converting unit 5 and the drawing unit 6, which configure the color adjusting apparatus 1 shown in FIG. 4, correspond to capabilities implemented by executing the program stored in the memory 1002.

The input device 1003 is, for example, a keyboard, a pointing device, a touch panel, etc., and used to input an instruction or information from a user. The output device 1004 is, for example, a display, a printer, a speaker, etc., and used to output the contents of an input made by a user, and the first to the fourth three-dimensional regions, which are process results.

The external storage device 1005 is, for example, a magnetic disk device, an optical disk device, a magneto-optical disk device, a tape device, etc. The information processing device stores the program and the data on the external storage device 1005, and loads the program and the data into the memory 1002 and uses them on demand.

The medium driving device 1006 drives a portable recording medium 1009, and accesses its recorded contents. The portable recording medium 1009 is an arbitrary computer-readable recording medium such as a memory card, a flexible disk, a CD-ROM (Compact Disk Read Only Memory), an optical disk, a magneto-optical disk, etc. An operator stores the above described program and data onto the portable recording medium 1009, and loads the program and the data into the memory 1002 and uses them on demand.

The network connecting device 1007 is connected to an arbitrary communications network such as a LAN (Local Area Network), the Internet, etc., and performs data conversion accompanying a communication. The information processing device receives the above described program and data from an external device via the network connecting device 1007, loads the program and the data into the memory 1002, and uses them, as occasion demands.

Figure 14:
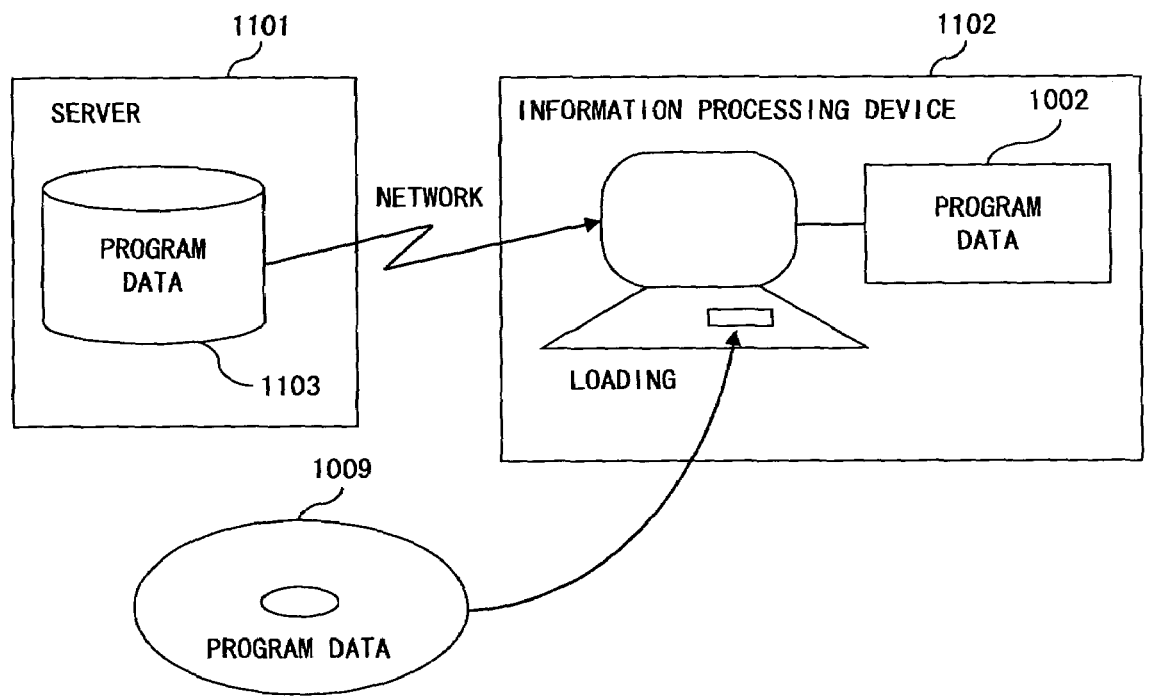
FIG. 14 is a schematic showing recording media.

FIG. 14 shows computer-readable recording media which can provide a program and data to the information processing device shown in FIG. 13. The program and the data stored onto the portable recording medium 1009 or in a database 1103 of a server 1101 are loaded into a memory 1002 of the information processing device 1102. The server 1101 generates a carrier signal for carrying the program and the data, and transmits the generated signal to the information processing device 1102 via an arbitrary transmission medium on a network. The CPU 1001 executes the program by using the data to perform necessary processes.

What is claimed is:

1. A recording medium causing a computer to execute a color adjustment program used for an image quality adjustment comprising:
   identifying selected adjustment type that represents either shift process or centering process;
   assigning weights to adjustment amounts of colors included in an adjustment range according to the selected adjustment type, a positional relationship with a target color in color space, and an adjustment amount of the target color, when information about the target color to be adjusted, the adjustment amount indicating an amount of the color adjustment made to the target color, and an adjustment range for deciding a range of colors to be adjusted along with the target color are input;
   calculating colors after the adjustment for the target color and the colors included in the adjustment range according to the weights; and
   drawing a three-dimensional region corresponding to the calculated colors in the color space;
   wherein the colors included in the adjustment range are moved in a same direction as an adjustment direction of the target color by the shift process and
   wherein the colors included in the adjustment range are moved in a direction toward the target color by the centering process.

2. A recording medium causing a computer to execute a color adjustment program used for an image quality adjustment comprising:
   assigning weights to adjustment amounts of colors included in an adjustment range according to a positional relationship with a target color in color space, and an adjustment amount of the target color, when information about the target color to be adjusted, the adjustment amount indicating an amount of the color adjustment made to the target color, and an adjustment range for deciding a range of colors to be adjusted along with the target color are input;
   calculating colors after the adjustment for the target color and the colors included in the adjustment range according to the weights; and
   drawing a three-dimensional region corresponding to the calculated colors in the color space wherein
   within the three-dimensional region, colors after the adjustment for the target color and a color included in a first adjustment range in the neighborhood of the target color within the adjustment range are drawn as a first three-dimensional region, and a color after the adjustment for a color included in a second adjustment range outside the first adjustment range within the adjustment range is drawn as a second three-dimensional region.

3. The recording medium according to claim 2, further comprising:
   calculating change amounts before and after the color adjustment for the colors included in the first and the second three-dimensional regions;
   determining whether or not the calculated change amounts are suitable values by whether or not the first three-dimensional region is included in the second three-dimensional region; and
   drawing a color a change amount of which is determined not to be a suitable value as a third three-dimensional region in the color space when the first three-dimensional region is not included in the second three-dimensional region.

4. The recording medium according to claim 2, further comprising:
   calculating a predetermined change as a difference of a predetermined color between before and after the color adjustment;
   calculating a change amount of colors included in the first or the second three-dimensional region between before and after the color adjustment;
   extracting a color, the change amount of which is the same as the predetermined change; and
   drawing the extracted color as a third three-dimensional region in the color space.

5. The recording medium according to claim 2, wherein:
   the colors included in the adjustment range are moved in a same direction as an adjustment direction of the target color in said calculating of the colors after the adjustment; and
   a same adjustment amount as the target color is given to the color included in the first adjustment range, an adjustment amount, which is decreased in stages, is given to colors positioned from a boundary between the first and the second adjustment ranges to a boundary between the second adjustment range and a range to which the adjustment is not made, and an adjustment amount of zero is given to a color at a boundary between the second adjustment range and the range to which the adjustment is not made, for remaining colors among the colors included in the adjustment range.

6. The recording medium according to claim 2, wherein:
   the colors included in the adjustment range are moved in a direction toward the target color in said calculating of the colors after the adjustment; and
   an adjustment amount, which is increased and decreased in stages so that the adjustment amount becomes a maximum at a boundary between the first and the second adjustment ranges, and the adjustment amount becomes zero at the target color and a boundary between the second adjustment range and a range to which the adjustment is not made, is given.

7. The recording medium according to claim 2, further comprising:
   making a color adjustment to the target color and the colors included in the adjustment range according to an instruction from a user.

8. A color adjusting apparatus for making an image quality adjustment, comprising:

an identifying unit to identify selected adjustment type that represents either shift process or centering process;

a weight assigning unit to assign weights to adjustment amounts of colors included in an adjustment range according to the selected adjustment type, a positional relationship with a target color in color space, and an adjustment amount of the target color, when information about the target color to be adjusted, the adjustment amount indicating an amount of the color adjustment made to the target color, and an adjustment range for deciding a range of colors to be adjusted along with the target color are input;

a calculating unit to calculate colors after the adjustment for the target color and the colors included in the adjustment range according to the weights; and a drawing unit to draw a three-dimensional region corresponding to the calculated colors in the color space;

wherein the colors included in the adjustment range are moved in a same direction as an adjustment direction of the target color by the shift process and wherein the colors included in the adjustment range are moved in a direction toward the target color by the centering process.

* * * * *